Patented Sept. 29, 1953

2,653,426

UNITED STATES PATENT OFFICE 2,653,426

FIXTURE FOR GENERATING INVOLUTES

Joseph Silvagi, Detroit, Mich.

Application May 1, 1952, Serial No. 285,489

11 Claims. (Cl. 51—232)

This invention relates to production machinery, and has particular reference to a device for holding work pieces upon which it is desired to form an involute curve, such as upon the teeth of a spur or helical gear.

An object of the invention is to generally improve devices of this character, and to provide an involute generator which is simple in construction, economical to manufacture, and efficient in operation.

Another object of the invention is to provide a device of the character indicated, which employs the technique of rolling a base cylinder on a fixed beam, which base cylinder supports the work piece, and using either a flat plane or a conical surface of a grinding wheel to form the involute curve on the work piece.

Another object of the invention is to provide a device of the character indicated, with which gears of a great variety of sizes may be worked upon by the simple expedient of changing the base circle and index plates.

Another object of the invention is to provide a device of the character indicated which may be utilized as a single purpose machine, or may be combined with another machine for more extended operations. For example, a conventional surface grinder may be converted into a gear grinder by utilizing this device on a magnetic chuck.

Another object of the invention is to provide a device of the character indicated, with which conical involute gears may be formed by setting the base of the device in a tilt angle.

The foregoing and other objects and advantages of the invention will become more apparent as the description proceeds, reference being made from time to time to the accompanying drawing forming part of the within disclosure, in which drawing.

Figure 1:
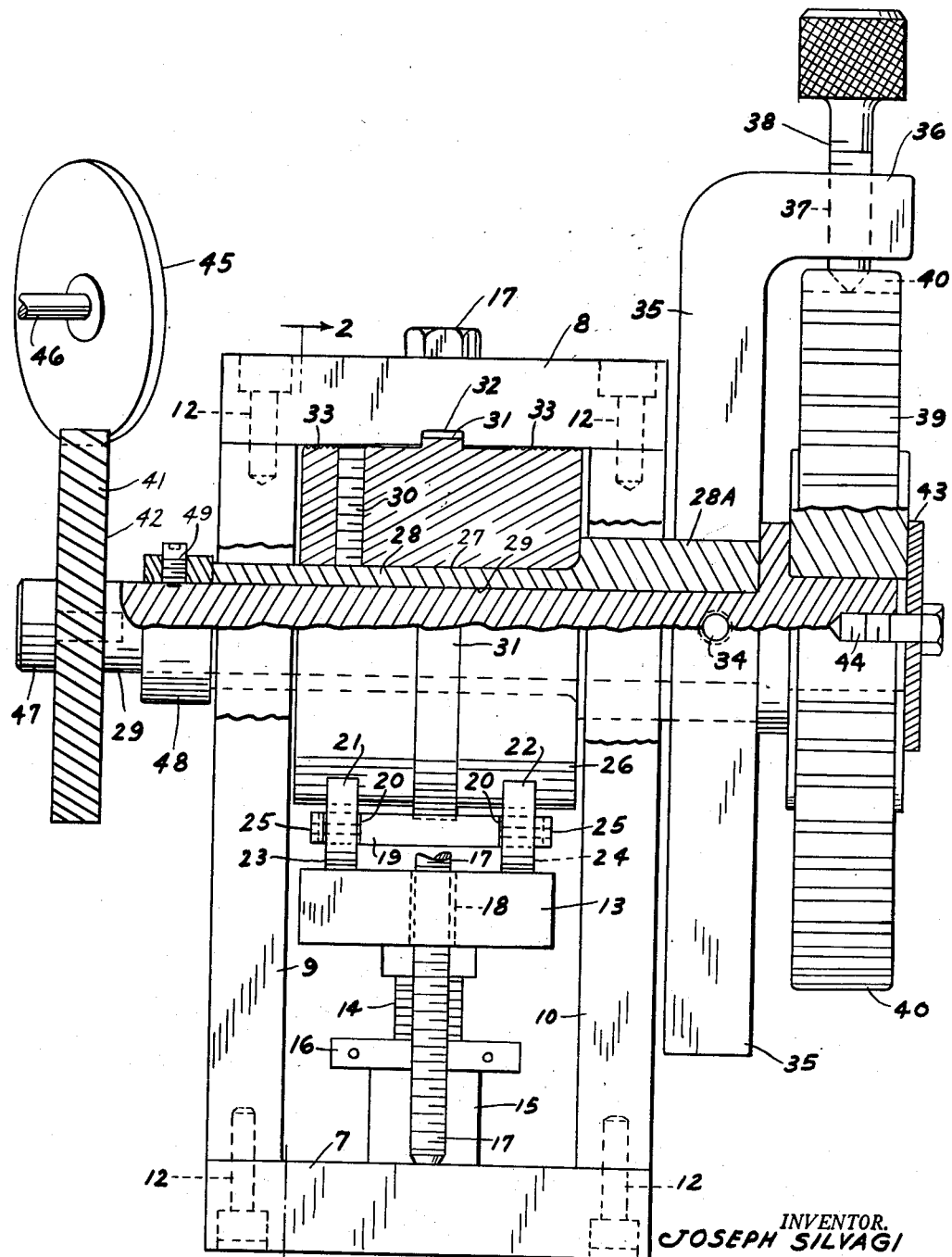
Fig. 1 is a side elevational view, with parts broken away, of a device embodying the invention.
Figure 2:
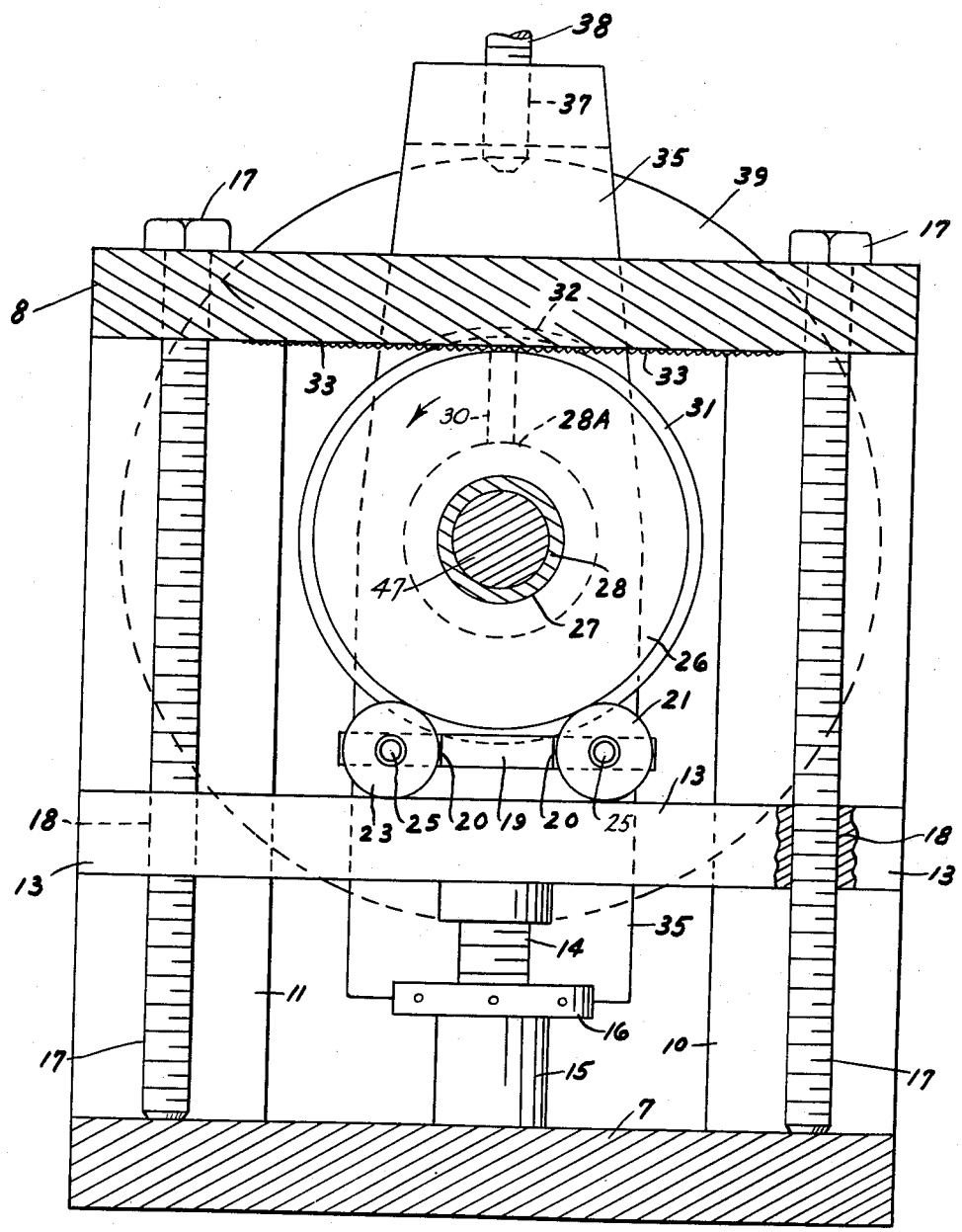
Fig. 2 is a section taken on the line 2—2 of Fig. 1.

Referring now more particularly to the drawing, it will be understood that in the embodiment herein disclosed the reference character 7 indicates a base plate, the reference character 8 indicates a top or cover member, and the reference characters 9, 10, and 11 indicate supporting members, all of which comprise a substantially hollow rectangular frame adapted to house and support the moving parts of the device. The members 7, 8, 9, 10, and 11 may be secured together by any suitable means, such as machine screws 12 or the like, the heads of which are preferably countersunk to provide flush surfaces at top and bottom.

A vertically adjustable platform 13 is supported on a screw jack 14, the base 15 of which rests on the base member 7. The screw jack 14 is raised and lowered by means of the nut 16, all of which is conventional. The platform 13 is further supported by means of threaded rods or bolts 17 which extend through threaded bores 18 formed at each end of the platform 13. The lower ends of the threaded rods or bolts 17 ride on the base member 7, whereby, upon rotation of the threaded rods or bolts 17, the platform 13 may be raised and lowered. Positioned on top of the platform 13 and adapted to move longitudinally thereon, is a carriage-like member which consists of a rectangular plate 19, having cut out portions 20 at either corner for the accommodation of the ball bearing rollers 21, 22, 23, and 24, which are adapted to rotate on suitable pins 25, which are press fitted into bores formed in the plate 19.

Positioned on top of the rollers 21, 22, 23, and 24 and rotatable therewith is a base circle member 26, which is in the form of a solid cylinder having a bore 27 therein, in which is press fitted a hollow shaft 28, in which hollow shaft 28 is slip fitted a solid shaft 29. The base circle member 26 is locked on the hollow shaft 28 by means of a set screw which engages a threaded bore 30. The base circle 26 is provided with a peripheral rib 31, which engages a slot 32 formed in the top frame member 8, which serves to prevent axial movement of the base circle member 26 before pressure is applied thereon as hereinafter described.

The upper frame member 8 has formed on its under side, as at 33, a plurality of serrations, which serrations are approximately .020 inch apart and formed with double angles of approximately 90°. The base circle member 26 is preferably made of softer metal than the upper frame member 8, so that when pressure is applied against the base circle member 26, and the latter is first rolled against the upper frame member 8, the serrations 33 are imparted to the periphery of the base circle member 26, so that there can be no slippage of the member 26 as it rolls against the under side of the member 8. This is an important feature of the invention.

The hollow shaft 28 is provided with an enlarged portion 28-A on which is secured by means of a set screw 34 an indexing arm 35, which arm 35 has an outwardly extending portion 36, the latter having a vertical bore 37 in which is mounted an indexing plunger 38. The plunger 38 is adapted to be movable in the bore 37 either by threading the same or by spring loading the plunger 38, so that it may be lifted against the spring load.

The central shaft 29 has mounted on it an indexing plate 39 which has indexing slots 40 equally spaced about its periphery, which indexing slots 40 are equal in number and are spaced to conform to the spacing of the teeth 41 on the gear work piece 42, which is mounted on the opposite end of the central shaft 29. The index plate 39 is held on the shaft 29 by means of a washer 43 and the machine screw 44. The reference character 45 indicates a grinding wheel mounted on the shaft 46, which grinding wheel is dressed to impart the proper curvature to the teeth 41 of the work piece 42. The work piece 42 is preferably held on the end of the shaft 29 by means of a machine screw 47, and the shaft 29 is held against axial thrust by means of a collar 48, which is secured thereto by means of a set screw 49.

In using the device, the proper base circle member 26 and the proper index plate 39, for the grinding of the work piece 42, are mounted and positioned as hereinabove described. Pressure is then exerted on the platform 13 by means of the threaded jack 14 and the threaded rods 17. The arm 35 is then rocked back and forth on its pivot, causing a rotating motion to be imparted to the index plate 39, the hollow shaft 28, the solid shaft 29, and the base circle 26, as well as the work piece 42. This causes the base circle 26 to roll against the serrations 33 formed on the under side of the frame member 8, whereby the frame serrations are imparted to the periphery of the base circle 26, so that thereafter there can be no slippage between the members 8 and 26. The rotation of the base circle 26, because of its supporting contact with the rollers 21, 22, 23, and 24, causes the carriage 19 to move in the direction of rotation of the base circle 26, which also causes a lateral movement of the base circle 26 and the carriage 19. This rotating and lateral movement of the base circle 26 generates an involute curve on the teeth 41 of the work piece 42 when the grinding wheel 45 is brought into contact therewith.

In the generation of an involute helicoid, the fixture is positioned on a surface grinder (not shown) having a reciprocable table. The axis of the cylindrical member 26 and simultaneously the workpiece 41, 42 is set at an angle with the surface grinder's reciprocal motion. As the cylindrical member 26 rolls along its circumference with non-slip contact against the serrated frame member 8, the wheel path generates a true helix on the workpiece 41, 42. The wheel axis remains perpendicular to the grinder's reciprocating motion. The shape of the wheel may be saucer shaped or trapezoidal in cross-section. Since the involute helicoid is a developable helicoid, it may be generated by a succession of straight line cuts moved along a helix. Thus, during generation of the helix on the work cylinder, an involute tooth is simultaneously generated. The straight line cuts will lie tangent to the base cylinder of the gear being formed.

Having described my invention, what I claim and desire to secure by Letters Patent is:

1. In a device of the character described in combination, a rectangular frame supporting a top plate provided with serrations on its under surface, a vertically movable platform positioned below said top plate, a carriage longitudinally shiftable on said platform, rollers on said carriage, a cylindrical member supported on the rollers of said carriage and arranged for rotation thereon and longitudinal travel therewith and further arranged for rolling contact with said top plate, a hollow shaft in said cylindrical member and rotatable therewith, a solid shaft rotatable in said hollow shaft, an indexing arm secured to said hollow shaft and movable therewith, an indexing plate secured to one end of said solid shaft and movable therewith, a plunger reciprocable in an extension of said indexing arm and having an end arranged to engage indexing slots formed on the periphery of said indexing plate whereby to rotate said plate, and means for supporting a work piece at the other end of said solid shaft.

2. The structure defined in claim 1, there being threaded openings in said top plate and said platform and threaded rods therein, for adjusting the vertical movement of said platform.

3. The structure defined in claim 1, in which said rectangular frame has open spaces at the sides thereof through which are extended the ends of said hollow shaft and said solid shaft.

4. The structure defined in claim 1, in which the length of the carriage is less than the diameter of said cylindrical member.

5. In a device of the character described in combination, a base plate, a top plate, corner posts for supporting said top plate, a vertically shiftable platform positioned below said top plate, a screw jack supported on said base plate and arranged to support said platform, threaded rods extending through openings in said top plate and threaded bores formed in said vertically shiftable platform, a carriage having wheels arranged to roll longitudinally on said platform, a cylindrical member supported on the wheels of said carriage for rotation and transverse movement therewith and arranged for rolling contact with said top plate, a hollow shaft extending through said cylindrical member and rotatable therewith, a solid shaft rotatable within said hollow shaft, an indexing plate secured to one end of said solid shaft, the other end of said shaft being arranged to support a work piece, and an indexing arm secured to an extension of said hollow shaft, said indexing arm having a plunger shiftable therein, one end of said plunger being arranged to engage driving elements formed on the periphery of said indexing plate.

6. The structure defined in claim 5, including uniformly spaced serrations formed on the under surface of said top plate and arranged to contact the periphery of said cylindrical member.

7. The structure defined in claim 5, in which said cylindrical member has a concentric peripheral rib arranged to engage an arcuate slot formed on the under side of said top plate member.

8. In a device of the character described in combination, a base plate, a top plate, corner posts for supporting said top plate on said base plate, a rectangular platform mounted for vertical adjustment on said base plate, a carriage having wheels arranged to roll on the upper surface of said platform, a cylindrical member having a diameter greater than the length of said carriage, said cylindrical member being in rolling contact with said top plate and being arranged to travel with said carriage and rotate with the wheels thereof, a hollow shaft concentrically mounted in said cylindrical member and extending beyond the sides of said corner post members, means for locking said cylindrical member to said hollow shaft, a solid shaft rotatable in said hollow shaft and extending beyond the ends thereof, a driving plate having peripheral indexing means thereon, secured to one end of said solid shaft, the other end of said solid shaft being arranged to support a work piece having teeth corresponding to said peripheral driving means, an enlarged section on said hollow shaft, an indexing arm secured to said hollow shaft extension, said arm having an outwardly extending portion, and a plunger in said arm extension, said plunger having an end adapted to engage the driving elements formed on the periphery of said indexing plate.

9. The structure defined in claim 8, including uniformly spaced serrations formed on the under face of said top plate member and arranged to contact the periphery of said cylindrical member.

10. The structure defined in claim 8, including threaded rods supported by said top plate member, and extending through threaded bores formed in said vertically shiftable platform.

11. The structure defined in claim 8, in which said cylindrical member has a peripheral rib arranged to engage an arcuate slot formed on the under face of said top plate member.

JOSEPH SILVAGI.

References Cited in the file of this patent
UNITED STATES PATENTS

| Number | Name | Date |
|---|---|---|
| 1,942,416 | Fellows | Jan. 9, 1934 |
| 1,961,663 | Goulder | June 5, 1934 |